(12) United States Patent
Baumgardt et al.

(10) Patent No.: US 11,673,479 B2
(45) Date of Patent: Jun. 13, 2023

(54) CIRCUIT ARRANGEMENT AND POWER SYSTEM

(71) Applicant: MOLABO GMBH, Ottobrunn (DE)

(72) Inventors: Andreas Baumgardt, Markt Schwaben (DE); Adrian Patzak, Aying (DE); Florian Bachheibl, Munich (DE)

(73) Assignee: Molabo GmbH, Ottobrunn (DE)

( * ) Notice: Subject to any disclaimer, the term of this patent is extended or adjusted under 35 U.S.C. 154(b) by 0 days.

(21) Appl. No.: 16/609,759

(22) PCT Filed: May 2, 2018

(86) PCT No.: PCT/EP2018/061194
§ 371 (c)(1),
(2) Date: Oct. 31, 2019

(87) PCT Pub. No.: WO2018/206366
PCT Pub. Date: Nov. 15, 2018

(65) Prior Publication Data
US 2020/0062134 A1    Feb. 27, 2020

(30) Foreign Application Priority Data

May 8, 2017    (EP) ..................................... 17169961

(51) Int. Cl.
*H02J 7/00*        (2006.01)
*B60L 50/60*       (2019.01)

(52) U.S. Cl.
CPC ............ *B60L 50/66* (2019.02); *H02J 7/0024* (2013.01); *B60L 2200/10* (2013.01);
(Continued)

(58) Field of Classification Search
CPC .. B60L 50/66; B60L 2200/10; B60L 2200/32; B60L 58/21; B60L 15/007;
(Continued)

(56) References Cited

U.S. PATENT DOCUMENTS

| | | | |
|---|---|---|---|
| 6,710,995 B2 | 3/2004 | Knoedgen | |
| 7,252,540 B2 * | 8/2007 | Tanaka | H01R 12/592 439/497 |

(Continued)

FOREIGN PATENT DOCUMENTS

| | | | |
|---|---|---|---|
| EP | 0332475 A2 * | 3/1989 | |
| EP | 1641066 A2 | 3/2006 | |

*Primary Examiner* — Toan T Vu
(74) *Attorney, Agent, or Firm* — Greenberg Traurig, LLP

(57) ABSTRACT

A circuit arrangement (11) for supplying an electric vehicle with power comprises a battery (10) with a first terminal (16) and a second terminal (17), and a reference potential terminal (12) directly connected to the second terminal (17) of the battery (10). The circuit arrangement (11) further comprises a first output (18) that is coupled to the first terminal (16) of the battery (10) via a first switch (20) and that is configured to be connected to an electric machine (33) of the electric vehicle, and a second output (19) that is coupled to the first terminal (16) of the battery (10) and that is configured to be connected to a power net (34) of the electric vehicle. Furthermore, a power system (32) for an electric vehicle comprises the circuit arrangement (11), an electric machine (33) and a power net (34). The first output (18) is coupled to the electric machine (33) and the second output (19) is coupled to the power net (34).

15 Claims, 10 Drawing Sheets

Figure 1A:
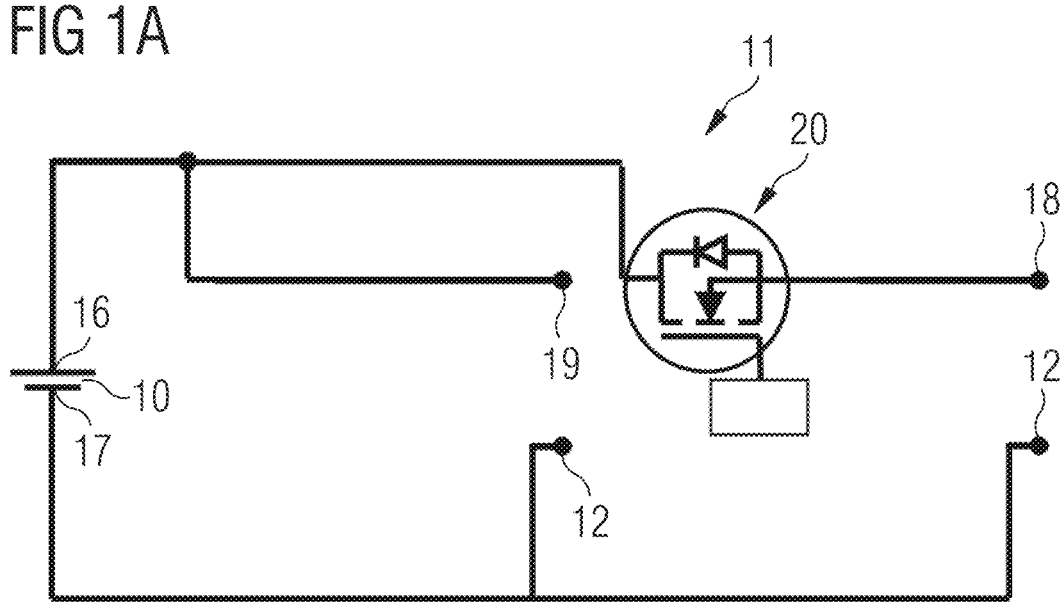

(52) U.S. Cl.
CPC ....... *B60L 2200/32* (2013.01); *B60Y 2200/91* (2013.01); *B60Y 2400/112* (2013.01)

(58) Field of Classification Search
CPC . B60L 58/10; B60L 1/00; H02J 7/0024; H02J 2310/46; H02J 7/00; B60Y 2200/91; B60Y 2400/112; Y02T 10/70; Y02T 10/64; B60R 16/033
USPC .................................................. 307/9.1, 10.1
See application file for complete search history.

(56) References Cited

U.S. PATENT DOCUMENTS

| | | | |
|---|---|---|---|
| 7,253,540 B1 | 8/2007 | Thalheim et al. | |
| 7,671,565 B2 | 3/2010 | Straubel et al. | |
| 2003/0117019 A1* | 6/2003 | Furukawa | B60L 58/20 307/10.6 |
| 2010/0185450 A1* | 7/2010 | Huang | H03H 17/0294 704/500 |
| 2013/0113495 A1* | 5/2013 | Kim | H01M 10/425 324/434 |
| 2014/0015456 A1* | 1/2014 | Nishio | H02P 3/14 318/376 |
| 2016/0272191 A1* | 9/2016 | Atluri | B60W 20/40 |
| 2017/0352931 A1* | 12/2017 | Yoshida | H01M 10/653 |
| 2021/0094441 A1* | 4/2021 | Sampson | H01M 10/44 |

* cited by examiner

CIRCUIT ARRANGEMENT AND POWER SYSTEM

CROSS-REFERENCE TO RELATED APPLICATIONS

This application is a U.S. National Phase Application of PCT International Application No. PCT/EP2018/061194, filed May 2, 2018, entitled "CIRCUIT ARRANGEMENT AND POWER SYSTEM", which claims the benefit of and priority to European Application No. 17169961.4, filed May 8, 2017, all of which is hereby incorporated by reference for all purposes.

The present application relates to a circuit arrangement for supplying an electric vehicle with power and to a power system for an electric vehicle.

Electric vehicles with an electric machine or an electric motor require a battery with a large capacity in order to enable traveling over large distances. In order to achieve a large capacity of the battery it is common to connect a plurality of battery cells with a small capacity, as for example lithium ion batteries. When connecting the plurality of battery cells in series the battery voltage can amount to several hundreds of volts. For these high voltages a special isolation of the battery and other safety precautions are required.

On the other hand other devices in the electric vehicle as for example the radio, a navigation system, lights or windscreen wipers, referred to as the power net of the electric vehicle, usually require a voltage which is smaller than 100 V.

It is an objective to provide a circuit arrangement for supplying an electric vehicle with power and a power system which require less isolation and safety precautions. A further objective is to provide a circuit arrangement for supplying an electric vehicle with power and a power system which can supply both the electric machine and the power net of the electric vehicle with power.

This objective is solved by the independent claims. Further embodiments are subject of dependent claims.

In one embodiment of the circuit arrangement for supplying an electric vehicle with power, the circuit arrangement comprises a battery with a first terminal and a second terminal. The first and the second terminal can be electrical contacts where the battery can be electrically contacted and where a load can be connected. The battery can comprise a plurality of battery cells that are connected with each other. The battery cells can be for example lithium ion batteries.

The electric vehicle can be any craft that can move on ground, in the air or on water. For example, the electric vehicle can be a car, an airplane or a boat.

The circuit arrangement further comprises a reference potential terminal directly connected to the second terminal of the battery. This means, the battery and the reference potential terminal are electrically connected. The battery voltage is given relative to the reference potential.

The circuit arrangement further comprises a first output that is coupled to the first terminal of the battery via a first switch and that is configured to be connected to an electric machine of the electric vehicle. The first output can be an electrical contact or an electrical terminal. The first output is electrically coupled to the first terminal of the battery via the first switch. The first terminal of the battery can be directly connected with the first switch and the first switch can be directly connected with the first output. With the first switch the connection between the battery and the electric machine can be activated and deactivated.

The electric machine of the electric vehicle can be for example an electric motor. The movement of the electric vehicle can be driven by the electric machine and the electric machine is the main engine for traction of the electric vehicle. It is also possible that the electric machine comprises several electric machines or several electric motors. For example, the electric machine can comprise an electric machine for a front axle and a back axle of an electric vehicle, respectively. Furthermore, it is possible that the electric machine comprises four electric machines or four electric motors.

That the first output is configured to be connected to an electric machine of the electric vehicle means that the first output can be electrically connected with the electric machine. If for example the electric machine comprises an electrical contact the first output can be electrically connected with the electrical contact of the electric machine. Preferably, the first output is configured to be connected to the electric machine in such a way that the electric machine can be supplied with power by the battery.

The circuit arrangement further comprises a second output that is coupled to the first terminal of the battery and that is configured to be connected to a power net of the electric vehicle. The second output can be an electrical contact or an electrical terminal. The second output is electrically coupled to the first terminal of the battery. The power net of the electric vehicle is configured to supply other devices in the electric vehicle than the electric machine with power. The other devices in the electric vehicle can be for example the radio, loudspeakers, a navigation system, lights or windscreen wipers.

The second output can be directly coupled to the first terminal of the battery. It is also possible that the second output is coupled to the first terminal of the battery via a second switch. The first terminal of the battery can be directly connected with the second switch and the second switch can be directly connected with the second output.

That the second output is configured to be connected to the power net of the electric vehicle means that the second output can be electrically connected with the power net. If for example the power net comprises an electrical contact the second output can be electrically connected with the electrical contact of the power net. Preferably, the second output is configured to be connected to the power net in such a way that the power net can be supplied with power by the battery.

The battery is configured to supply both the electric machine and the power net of the electric vehicle with power. Consequently, only one battery is required for the electric vehicle.

Preferably, the electric machine and the power net are supplied with the same voltage level by the battery. This means, the electric machine and the power net are operated at the same voltage level. The same voltage level in this case means that it is approximately the same voltage level. However, the exact voltage level at the electrical contacts of the electric machine and the power net can slightly differ from the battery voltage because of losses in the circuit arrangement. The voltage level at the electrical contacts of the electric machine and the power net can also slightly differ from the battery voltage because of losses at switches or other components of the circuit arrangement.

Advantageously, no converters to convert the battery voltage for the power net are required which is usually operated at smaller voltages than the electric machine.

It is also possible that the power net comprises a sub power net which is operated at a voltage which is different from the battery voltage. For example at least a part of the power net can be operated at a voltage which is lower than the battery voltage. The sub power net can for example be operated at 12 V.

In one embodiment of the circuit arrangement, the electric vehicle is at least one of:
a craft that can move on ground,
a craft that can move in the air,
a craft that can move on and/or in water.

It is possible that the electric vehicle can move only in certain places or in all of the places described above. The movement of the electric vehicle is at least partially driven by the electric machine.

In one embodiment of the circuit arrangement, the battery voltage which can be tapped between the first terminal and the second terminal of the battery is at most 60 V. Preferably, the battery voltage is at least 6 V. The battery voltage is a direct current (DC) voltage. For this voltage range it is possible that the battery is operated at separated extra low voltage and that it is compliant with standards defining the separated extra low voltage.

In a preferred embodiment the rated battery voltage amounts to 48 V.

Advantageously, less isolation and less safety precautions are required for these small battery voltages. Furthermore, a small battery voltage enables that the electric machine and the power net can both be supplied with power by the battery.

In one embodiment of the circuit arrangement, the second output is directly and permanently coupled to the first terminal of the battery. This means, the second output is not coupled to the first terminal via a second switch but the second output is directly coupled to the first terminal. In this case the power net of the electric machine is permanently coupled to the battery.

In one embodiment of the circuit arrangement, the second output is coupled to the first terminal of the battery via a second switch. The first terminal of the battery can be directly connected with the second switch and the second switch can be directly connected with the second output. With the second switch the connection between the battery and the power net can be activated and deactivated.

In one embodiment of the circuit arrangement, the electric machine to which the first output is configured to be connected to is the traction engine of the electric vehicle. This means, the movement of the electric vehicle is driven by the electric machine and the electric machine is the main engine for traction of the vehicle. Preferably, the electric machine is the only traction engine of the electric vehicle and the electric vehicle does not comprise another traction engine as for example a petrol engine.

In one embodiment of the circuit arrangement, the first switch comprises at least two sub-switches arranged in at least two parallel lines where the parallel lines are connected with each other by an inductive connection which comprises at least one inductivity. The term "line" refers to an electrical connection. Alternative expressions for "line" are line section, chain, string or strand. The at least two sub-switches can be mechanical or electro-mechanical switches or semi-conductor switches. The at least two sub-switches are connected with each other in parallel. This means at least two lines comprising each a sub-switch are connected with each other in parallel. The at least two lines are connected with each other by an inductive connection. The inductive connection can be an electrical connection between the at least two lines. That the inductive connection comprises at least one inductivity means that the at least two lines are connected with each other via the inductivity. The inductivity can comprise a first electrical contact which is connected to one of the at least two lines. The inductivity further can comprise a second electrical contact which is connected to another one of the at least two lines. The inductivity comprises an inductor as for example a coil.

The at least two sub-switches of the first switch are usually opened with small time delays. In order to avoid that the current from the battery towards the first output only flows through the sub-switch which is opened at last the inductivities allow compensation currents between the sub-switches and avoid rapidly rising currents in the first switch.

In one embodiment of the circuit arrangement, the first terminal and the second terminal of the battery are coplanar or coaxial. The first and the second terminal can for example be arranged at an outer surface of the battery. For example, the first and the second terminal can comprise the same or a similar shape. Advantageously, the first terminal and the second terminal are coplanar or coaxial in order to reduce the extent of the magnetic field induced by the current flowing through the terminals.

In one embodiment of the circuit arrangement, the first terminal and/or the second terminal of the battery comprise at least two contacts, respectively. The at least two contacts of the first and/or the second terminal can be arranged next to each other or on top of each other. It is also possible that the at least two contacts of the first and/or the second terminal are arranged at different side surfaces of the battery. As the battery voltage is small, the currents at the first and the second terminal can be high. Therefore, it is advantageous to distribute the current over several electrical contacts.

In one embodiment of the circuit arrangement, the first terminal and the second terminal of the battery are arranged coaxial. Also in this way the extent of the magnetic field induced by the current flowing through the terminals is reduced.

In one embodiment of the circuit arrangement, the first terminal and/or the second terminal of the battery are arranged as plugs. In another embodiment of the circuit arrangement, the first terminal and/or the second terminal of the battery are arranged as sockets.

In one embodiment of the circuit arrangement, the battery comprises at least one line of battery cells, where a first group comprises a plurality of battery cells connected to each other in parallel, a second group comprises a plurality of battery cells connected to each other in parallel, and the first group and the second group are connected with each other in series forming the line of battery cells.

The battery cells can be for example lithium ion batteries with rated cell voltages between 3 and 4 V. The battery cells each comprise electrical contacts via which they can be electrically contacted. This means, in the first group and in the second group the battery cells are connected in parallel in an electrical circuit, respectively. The first group and the second group are connected in series in an electrical circuit.

The term "line" refers to a plurality of battery cells electrically connected to each other. Each line comprises at least a first group and a second group that are connected with each other in series. Alternative expressions for "line" are line section, chain, string or strand.

It is possible that further groups of battery cells are connected in series with the first group and the second group. Also the further groups comprise a plurality of battery cells connected to each other in parallel.

The battery cells are arranged in such a way that a small battery voltage is enabled. A small battery voltage can be for example a voltage which is equal to or smaller than 60 V.

The number of battery cells connected with each other in the first group and in the second group, respectively, are chosen in such a way that the capacity of the battery is as high as required for an electric vehicle. At the same time, the number of groups connected to each other in series is kept small enough such that the battery voltage does not exceed a desired value.

Therefore, the battery is configured in such a way that the battery voltage is small. This means, the battery voltage can be for example below a set maximum value.

Advantageously, less isolation and less safety precautions are required for small battery voltages. Furthermore, the electric machine and the power net are both supplied with power by the battery. No converters are required to convert the battery voltage for the power net which is usually operated at small voltages.

In one embodiment of the circuit arrangement, the line is connected to at least one further line in parallel, where the further line comprises the same features as the line, and a fuse is connected to a circuit node of the line and to a circuit node of the further line. This means, the further line comprises at least one first group and at least one second group of battery cells. The line and the at least one further line are connected with each other in parallel in an electrical circuit.

By connecting the line and at least one further line in parallel to each other the capacity of the battery is increased. Consequently, the number of groups connected in series to each other in each line can be kept small enough such that the battery voltage does not exceed a desired value and at the same time the capacity of the battery is as high as required for an electric vehicle.

Due to slight differences between the battery cells the currents in the different lines, referred to as line currents, can differ from each other. Consequently, the battery cells in a line with a higher line current are discharged more than battery cells in a line with a smaller line current. This means, the battery cells that are discharged more are degrading and aging faster than the other battery cells. Furthermore, it is possible that compensation currents arise if the power consumed by for example the electric machine or another load changes with time. By employing the fuse the different line currents can be regulated such that all line currents are the same or very similar. Furthermore, if for example a battery cell in a line is defective a high line current can arise in the line. With the fuse it is avoided that the high line current also flows through further lines.

In one embodiment of the circuit arrangement, the fuse is a positive temperature coefficient thermistor. In the case of high line currents the resistance of the positive temperature coefficient thermistor increases such that the high line current cannot flow from the line to the further line. If the line current decreases again the positive temperature coefficient thermistor cools down again and the resistance decreases.

In one embodiment of the circuit arrangement, the battery comprises at least two battery modules. This means, the battery cells of the battery are distributed over the at least two battery modules. Every battery module comprises a plurality of battery cells. By distributing the battery cells to the different battery modules it is possible to arrange the different battery modules at different places in the electric vehicle. Therefore, all places in the electric vehicle where there is space for battery modules can be used.

Moreover, the battery modules can be configured to be exchanged separately from each other. This means, at least some of the battery modules can be removed from the electric vehicle and be replaced by for example charged battery modules. For example, battery modules that are arranged in easily accessible places of the electric vehicle as the trunk can be exchanged. In this way, a driver or a user of the electric vehicle does not have to wait until all battery modules are recharged before continuing to drive but the driver or the user can exchange some battery modules which takes less time than recharging all battery modules.

In one embodiment of the circuit arrangement, the at least two battery modules are configured to be electrically coupled to the electric machine of the electric vehicle. In this embodiment the electric machine is employed to equalize the line currents of the different lines of the battery. If an electric machine comprises different electrical phases each line is electrically connected to one or more electrical phases. By supplying the electrical phases with different DC currents the line currents can be regulated and equalized. As the electric machine is controlled by AC currents of the different electrical phases the regulation of the line currents can take place both when the electric machine is operated and when it is not operated since the line currents are regulated only by DC currents. Alternatively, it is possible to employ the electric machine partially in motor mode and partially in generator mode for regulating the line currents.

If single battery modules can be exchanged and be replaced by charged battery modules the charging level of the charged battery modules and the battery modules which are not replaced can be very different. This means, high compensation currents can arise. By regulating the line currents by coupling the battery modules to the electric machine the losses during regulation of the line currents are smaller in comparison to losses during a regulation of the line currents by passive elements as for example a positive temperature coefficient thermistor.

In one embodiment of the circuit arrangement, the at least two battery modules are arranged in parallel and each battery module is assigned a respective switch to activate and/or deactivate the respective battery module. The switch can be for example a DC/DC converter, an electro mechanical switch, a semiconductor switch or an electrical switch. In this way, the battery modules can be arranged in different places of the electric vehicle and the risk of a local damage of the battery is reduced as a damaged battery module can be disconnected from the other battery modules by the respective switch.

In addition, a power system for an electric vehicle is provided.

In one embodiment of the power system for an electric vehicle, the power system comprises an embodiment of the circuit arrangement as described above.

The power system further comprises an electric machine and a power net, where the first output is electrically coupled to the electric machine and the second output is electrically coupled to the power net. This means, the battery is configured to supply both the electric machine and the power net of the electric vehicle with power. Consequently, only one battery is required for the electric vehicle.

The power system can be comprised by an electric vehicle. The power system is arranged to supply the electric vehicle with power, to enable movement of the electric vehicle and to enable the operation of the devices of the power net.

Preferably, the battery voltage is at least 6 V and at most 60 V. For example, the rated battery voltage amounts to 48 V. Advantageously, less isolation and less safety precautions are required for these small battery voltages. Furthermore, a small battery voltage enables that the electric machine and the power net can both be supplied with power by the battery of the power system.

In one embodiment of the power system, the electric machine and the power net are supplied with the same voltage level by the battery. This means, the electric machine and the power net are operated at the same voltage level. The same voltage level in this case means that it is approximately the same voltage level. However, the exact voltage level at the electrical contacts of the electric machine and the power net can slightly differ from the battery voltage because of losses in the circuit arrangement. The voltage level at the electrical contacts of the electric machine and the power net can also slightly differ from the battery voltage because of losses at switches or other components of the circuit arrangement.

It is also possible that the power net comprises a sub power net which is operated at a voltage which is different from the battery voltage. For example at least a part of the power net can be operated at a voltage which is lower than the battery voltage. The sub power net can for example be operated at 12 V.

Advantageously, no converters to convert the battery voltage for the power net are required which is usually operated at smaller voltages than the electric machine.

In one embodiment of the power system, the electric machine is only powered by the battery. This means, the movement of the electric vehicle is driven by the electric machine and the electric machine is the main engine for traction of the vehicle. The power system and the electric vehicle do not comprise another source of power for the electric machine than the battery. Preferably, the electric machine is the only traction engine of the electric vehicle and the electric vehicle does not comprise another traction engine as for example a petrol engine.

The following description of figures may further illustrate and explain exemplary embodiments. Components that are functionally identical or have an identical effect are denoted by identical references. Identical or effectively identical components might be described only with respect to the figures where they occur first. Their description is not necessarily repeated in successive figures.

Figure 1B:
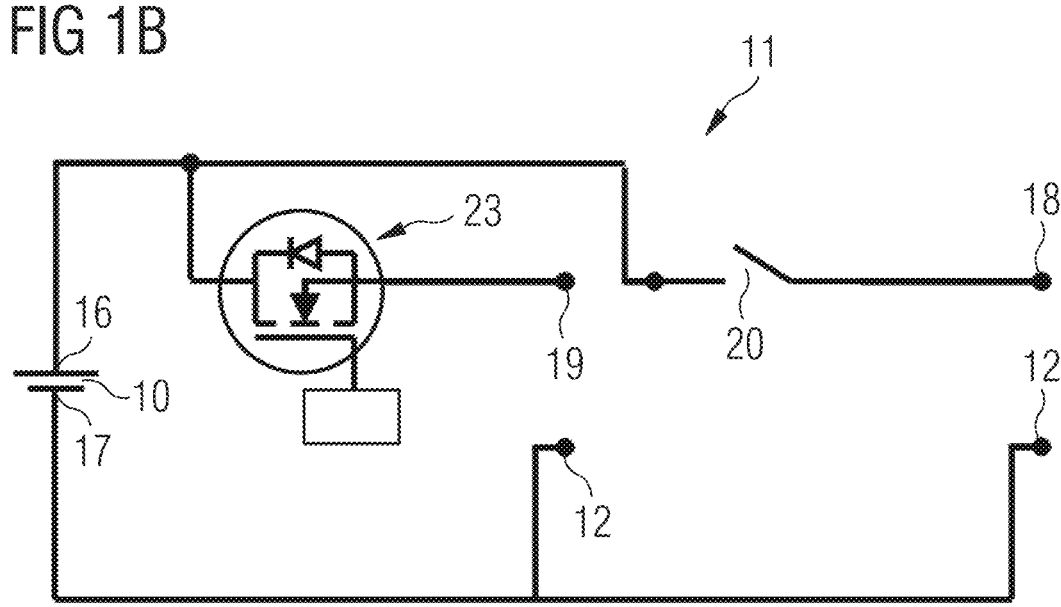
Figure 1C:
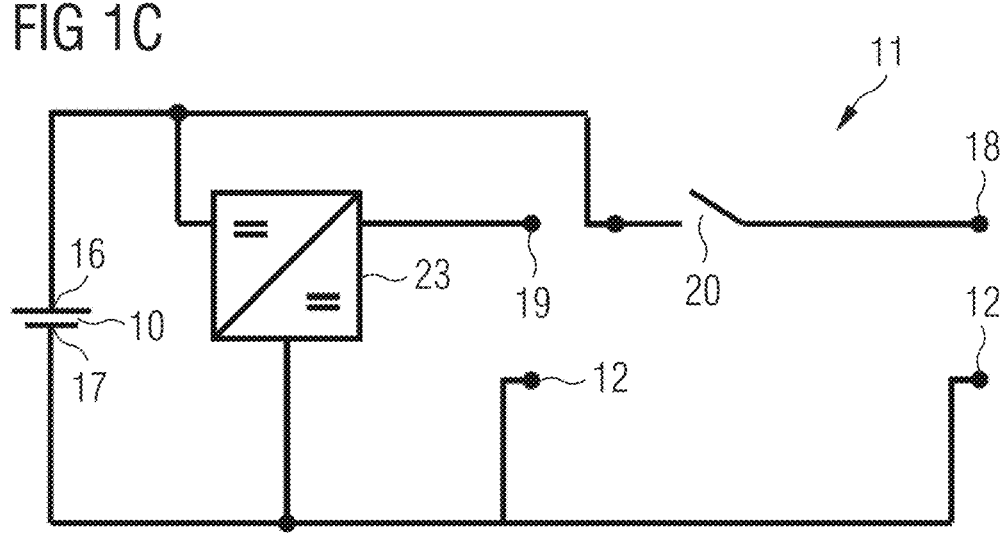

In FIGS. 1A, 1B and 1C different embodiments of the circuit arrangement are shown.

Figure 2:
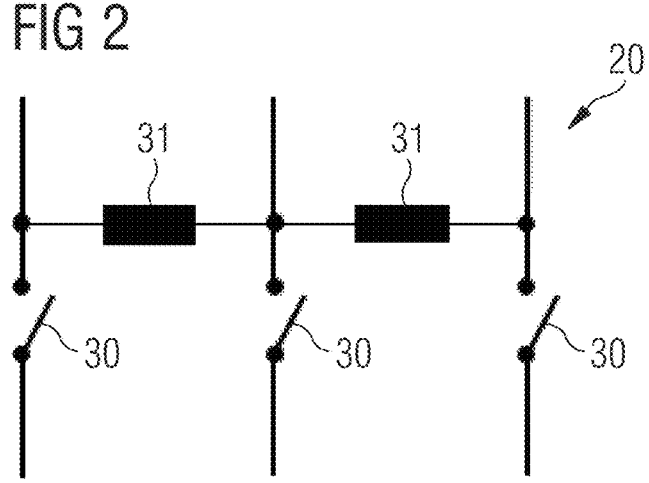

In FIG. 2 an embodiment of the first switch is shown.

In FIGS. 3A, 3B, 3C, 4A, 4B, 4C, 4D, 4E, 4F, 4G, 4H, 4I, 5A, 5B, 6A and 6B electrical contacts of the battery are shown.

Figure 7A:
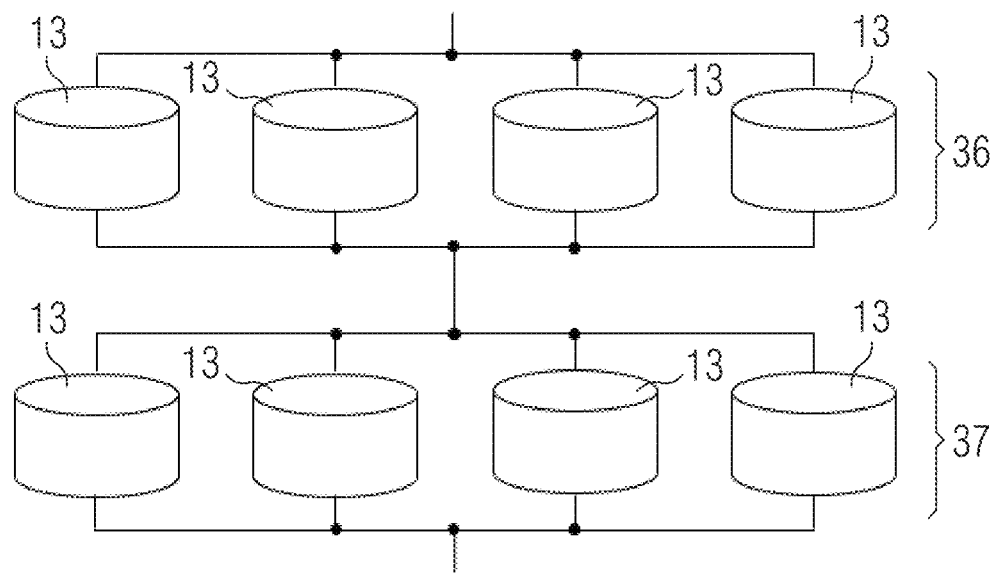

In FIG. 7A a first group and a second group of battery cells are shown.

Figure 7B:
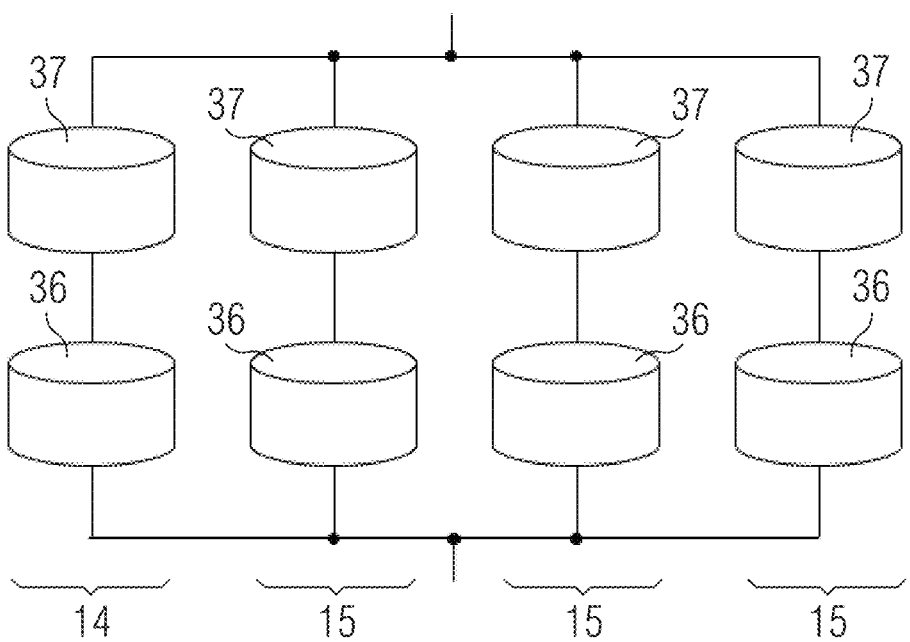
Figure 8:
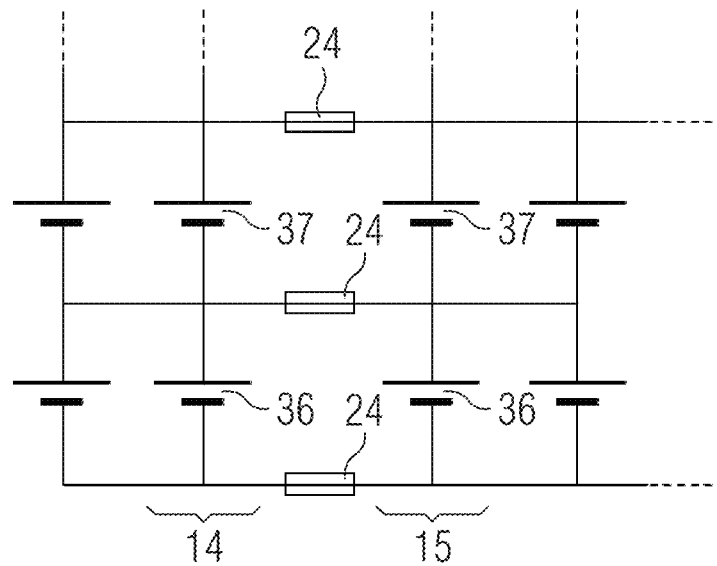

In FIGS. 7B and 8 four lines of battery cells are shown.

Figure 9A:
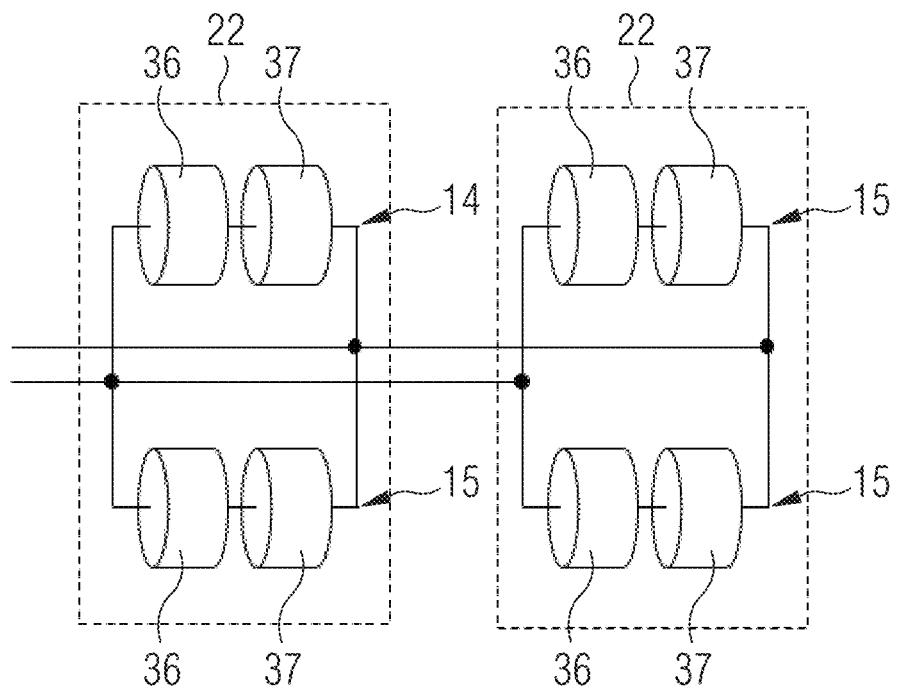
Figure 9B:
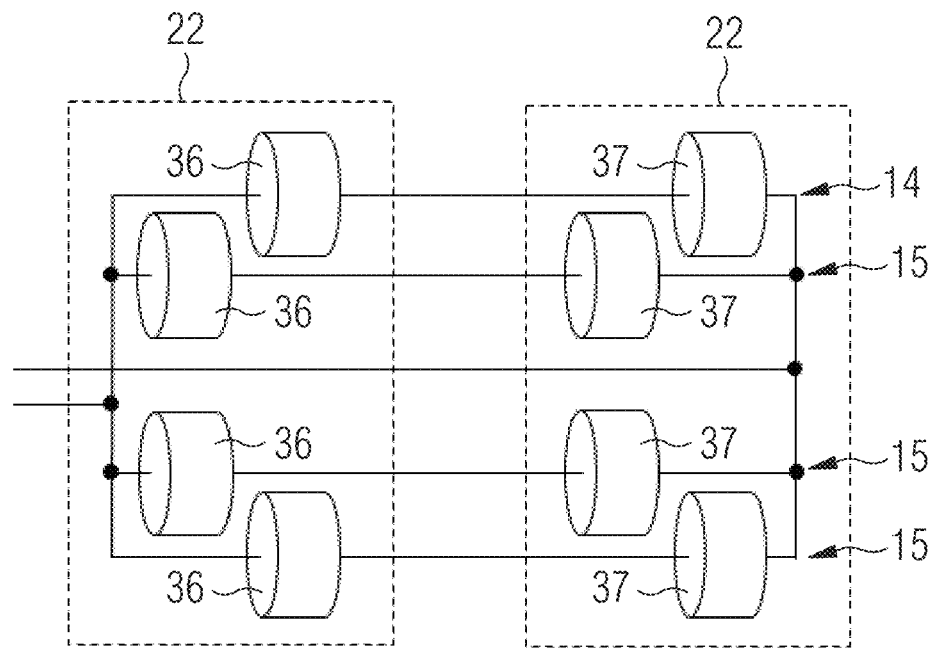

In FIGS. 9A and 9B two battery modules are depicted.

Figure 10:
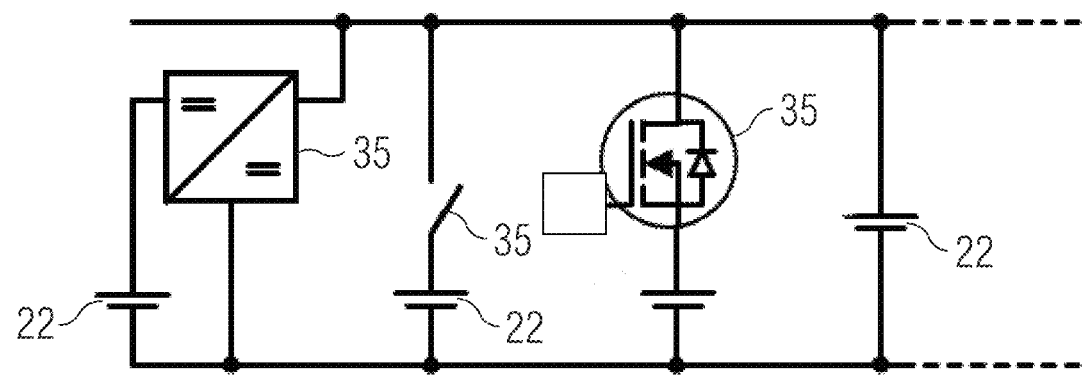

FIG. 10 shows an electrical circuit with battery modules connected to each other in parallel.

Figure 11:
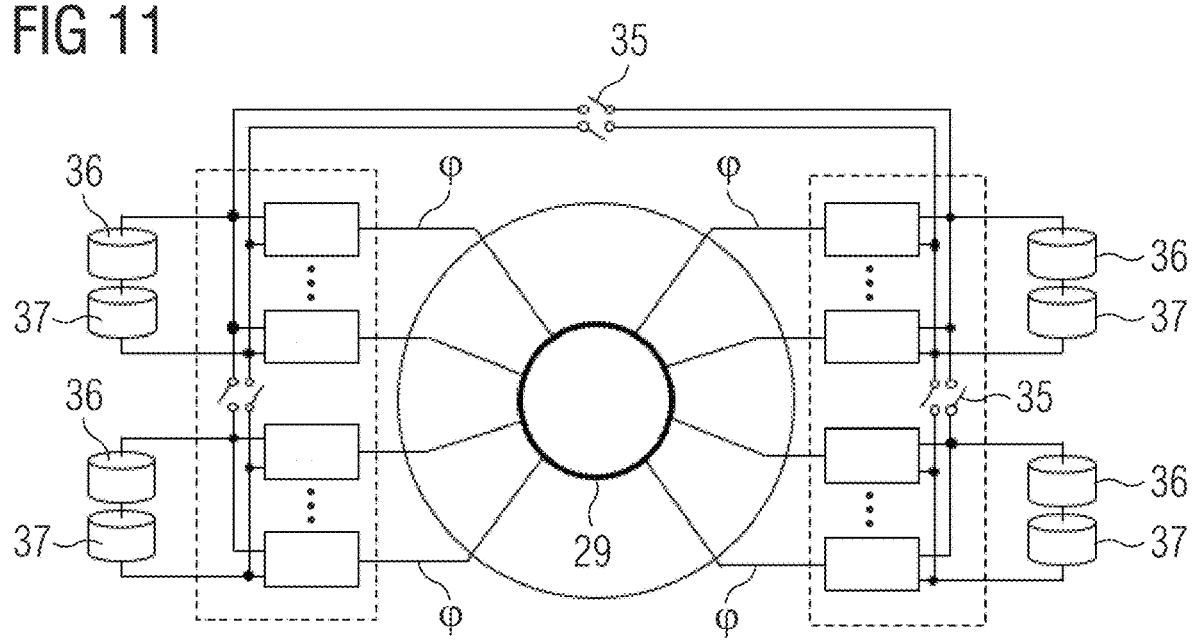

In FIG. 11 battery cells connected to the electric machine are shown.

Figure 12A:
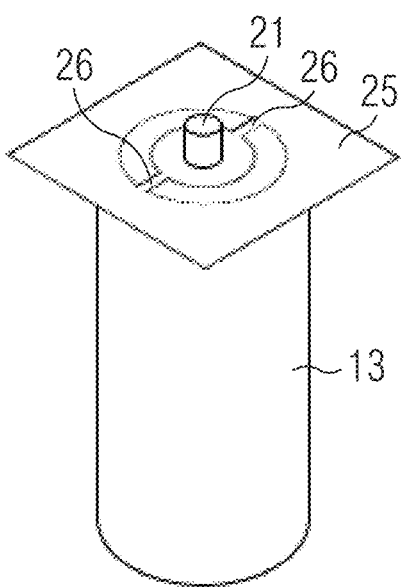
Figure 12B:
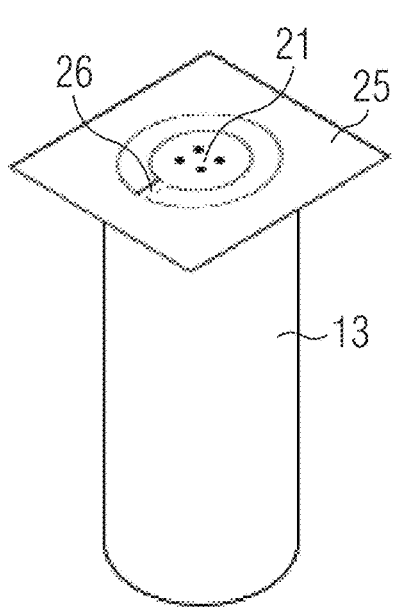
Figure 13:
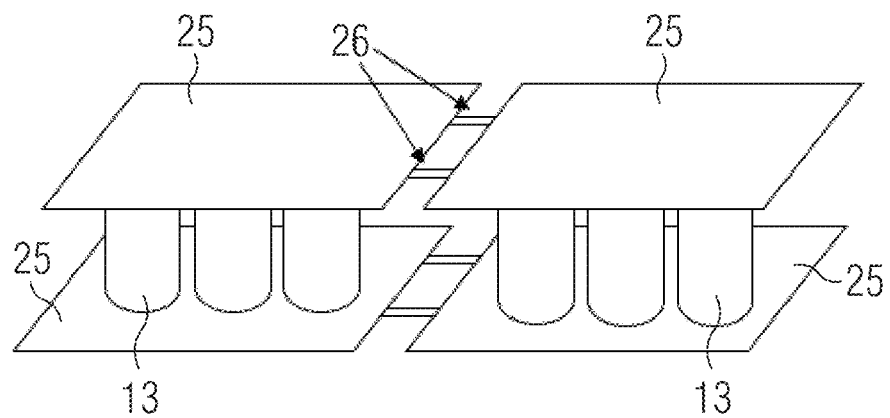

With FIGS. 12A, 12B and 13 fuses for battery cells are described.

Figure 14:
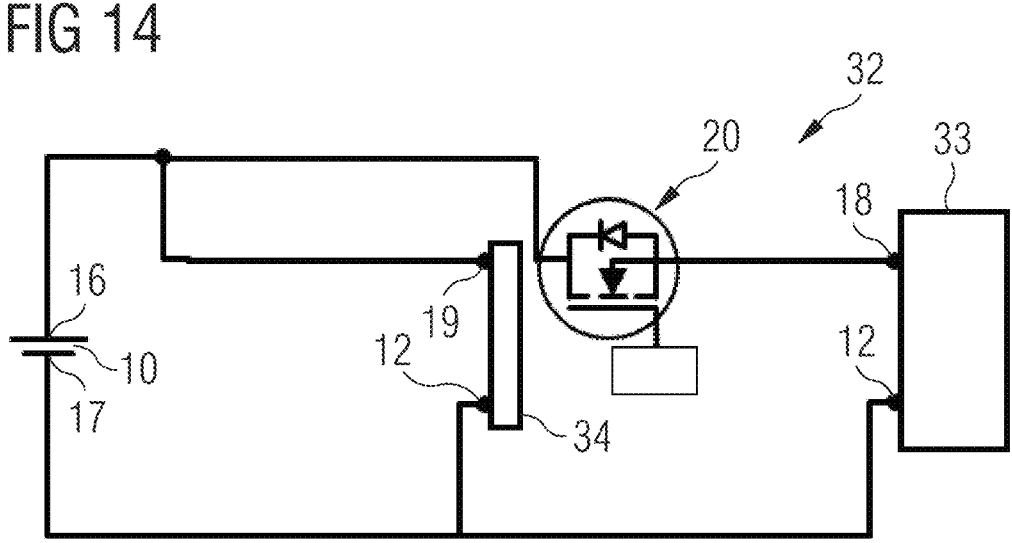

In FIG. 14 an embodiment of the power system is shown.

In FIG. 1A an embodiment of a circuit arrangement 11 for supplying an electric vehicle with power is shown. The circuit arrangement 11 comprises a battery 10 with a first terminal 16 and a second terminal 17. The first terminal 16 and the second terminal 17 can be electrical contacts where the battery 10 can be electrically contacted and where a load can be connected. The second terminal 17 of the battery 10 is directly connected to a reference potential terminal 12.

The battery voltage is given in relation to the reference potential. The reference potential terminal 12 is connected to a further reference potential terminal 12.

The first terminal 16 of the battery 10 is coupled to a first output 18 via a first switch 20. In this embodiment the first switch 20 is a semiconductor switch. The first output 18 is configured to be connected to an electric machine 33 of the electric vehicle. A second output 19 is coupled to the first terminal 16 of the battery 10 via an electric line or an electric cable. The second output 19 is configured to be connected to a power net 34 of the electric vehicle.

Electric lines or cables crossing each other in the figures are electrically isolated against each other. Electric lines or cables which are connected with a connection point in the figures are electrically connected with each other.

That the first output 18 is configured to be connected to an electric machine 33 of the electric vehicle means that the first output 18 can be electrically connected with the electric machine 33. If for example the electric machine 33 comprises an electrical contact the first output 18 can be electrically connected with the electrical contact of the electric machine 33. Preferably, the first output 18 is configured to be connected to the electric machine 33 in such a way that the electric machine 33 can be supplied with power by the battery 10.

That the second output 19 is configured to be connected to the power net 34 of the electric vehicle means that the second output 19 can be electrically connected with the power net 34. If for example the power net 34 comprises an electrical contact the second output 19 can be electrically connected with the electrical contact of the power net 34. Preferably, the second output 19 is configured to be connected to the power net 34 in such a way that the power net 34 can be supplied with power by the battery 10.

The battery 10 is configured to supply both the electric machine 33 and the power net 34 of the electric vehicle with power. Consequently, only one battery 10 is required for the electric vehicle.

In FIG. 1B a further embodiment of the circuit arrangement 11 is shown. In this embodiment the second output 19 is coupled to the first terminal 16 of the battery 10 via a second switch 23. The second switch 23 is a semiconductor switch. It is also possible that the second switch 23 is any other type of switch. The first switch 20 is an electro-mechanical switch. It is also possible that the first switch 20 is any other type of switch.

In FIG. 1C a further embodiment of the circuit arrangement 11 is shown. In this embodiment the second switch 23 is a DC/DC converter. Advantageously, with a DC/DC converter the second output 19 can be completely decoupled from the battery 10 and the first output 18.

In FIG. 2 an embodiment of the first switch 20 is shown. The first switch 20 comprises three sub-switches 30 that are connected with each other in parallel. Thus, the three sub-switches 30 are arranged in three parallel lines where the parallel lines are connected with each other by an inductive connection which comprises an inductivity 31, respectively. The sub-switches 30 can be mechanical or electro-mechanical switches or semiconductor switches. The inductive connection is an electrical connection between the three lines. That the inductive connections comprise an inductivity 31 means that the three lines are connected with each other via the inductivity 31. The inductivity 31 comprises an inductor as for example a coil.

The sub-switches 30 of the first switch 20 are usually opened with small time delays. In order to avoid that the current from the battery 10 towards the first output 18 only flows through the sub-switch 30 which is opened at last the inductivities 31 allow compensation currents between the sub-switches 30 and avoid rapidly rising currents in the first switch 20.

Figure 3A:
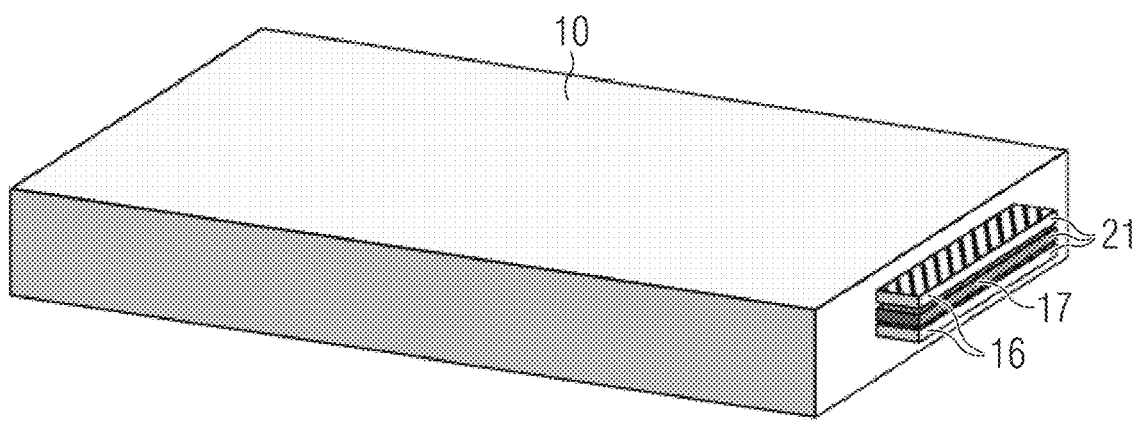

In FIG. 3A a battery 10 with a first terminal 16 and a second terminal 17 is shown. The first terminal 16 and the second terminal 17 are arranged at a side surface of the battery 10. The first terminal 16 comprises two contacts 21 which are marked hatched. The second terminal 17 comprises one contact 21 which is marked solid. The contacts 21 of the first terminal 16 and of the second terminal 17 have the same shape. The first terminal 16 and the second terminal 17 are coplanar. Advantageously, the first terminal 16 and the second terminal 17 are coplanar in order to reduce the extent of the magnetic field induced by the current flowing through the terminals 16, 17.

Figure 3B:
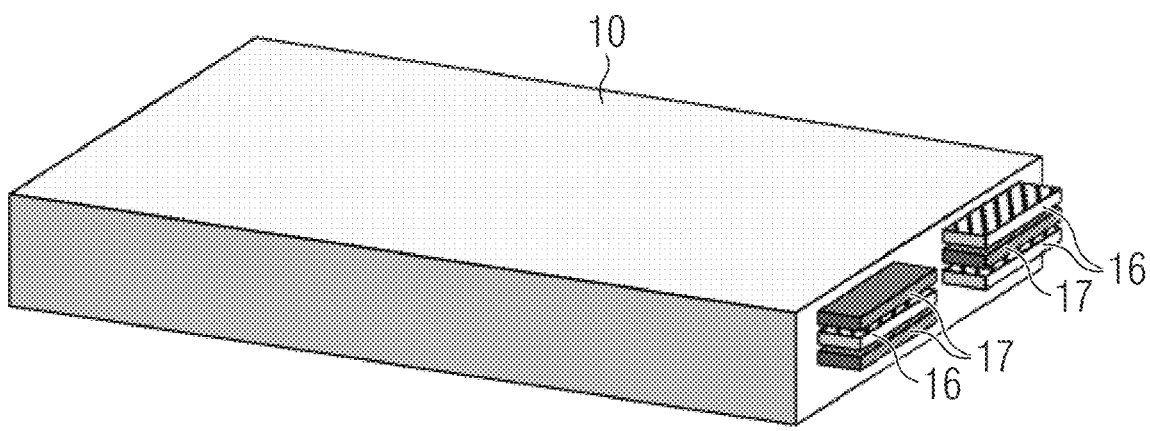

In FIG. 3B an alternative to arrange the first terminal 16 and the second terminal 17 at a side surface of the battery 10 is shown. Both terminals 16, 17 comprise three contacts 21. A contact 21 of the first terminal 16 is arranged between two contacts 21 of the second terminal 17 in a coplanar arrangement. Moreover, a contact 21 of the second terminal 17 is arranged between two contacts 21 of the first terminal 16 in a coplanar arrangement.

Figure 3C:
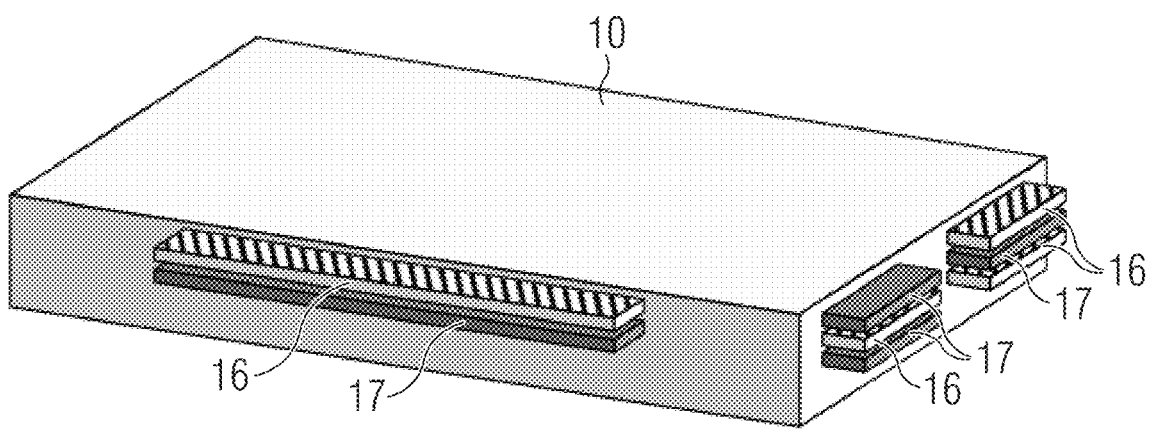

In FIG. 3C an alternative to arrange the first terminal 16 and the second terminal 17 at a side surface of the battery 10 is shown. The battery 10 comprises the same contacts 21 as shown in FIG. 10B and furthermore two contacts 21 at a further side surface of the battery 10. At the further side surface a contact 21 of the first terminal 16 and a contact 21 of the second terminal 17 are arranged next to each other in a coplanar arrangement. As the battery voltage is small, the currents at the first terminal 16 and at the second terminal 17 can be high. Therefore, it is advantageous to distribute the current over several electrical contacts 21.

In FIGS. 4A to 4I nine alternatives to arrange the first terminal 16 and the second terminal 17 at a side surface of the battery 10 are shown. The contacts 21 of the first terminal 16 are marked hatched and the contacts 21 of the second terminal 17 are marked solid. In all embodiments the terminals 16, 17 are arranged coplanar or coaxial in order to reduce the extent of the magnetic field induced by the current flowing through the terminals 16, 17.

Figure 4A:
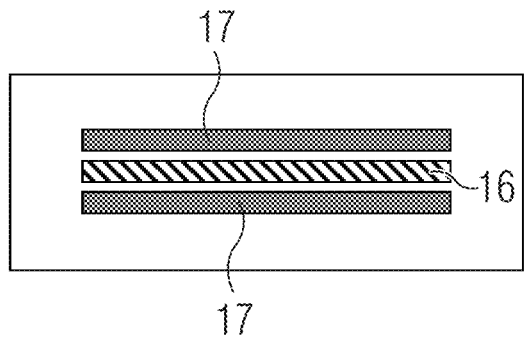

In FIG. 4A the first terminal 16 comprises one contact 21 and the second terminal 17 comprises two contacts 21. All contacts 21 are rectangular shaped and arranged coplanar. The first terminal 16 is arranged between the two contacts 21 of the second terminal 17.

Figure 4B:
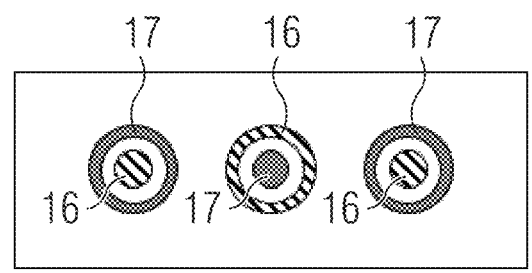

In FIG. 4B the first terminal 16 and the second terminal 17 each comprise three contacts 21. A first contact 21 of the first terminal 16 is circular shaped. The first contact 21 of the first terminal 16 is surrounded by a ring-shaped contact 21 of the second terminal 17. A second contact 21 of the second terminal 17 is circular shaped. The second contact 21 of the second terminal 17 is surrounded by a ring-shaped contact 21 of the first terminal 16. A third contact 21 of the first terminal 16 is circular shaped. The third contact 21 of the first terminal 16 is surrounded by a ring-shaped contact 21 of the second terminal 17.

Figure 4C:
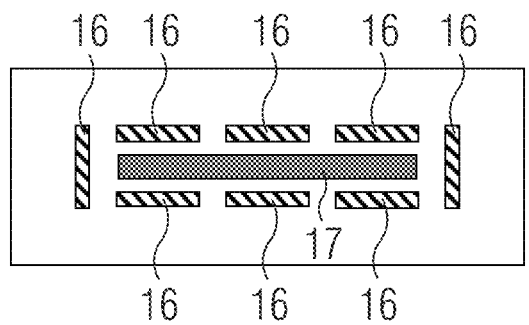

In FIG. 4C the first terminal 16 comprises eight contacts 21 and the second terminal 17 comprises one contact 21. All contacts 21 are rectangular shaped. The contacts 21 of the first terminal 16 are coaxially arranged around the second terminal 17.

Figure 4D:
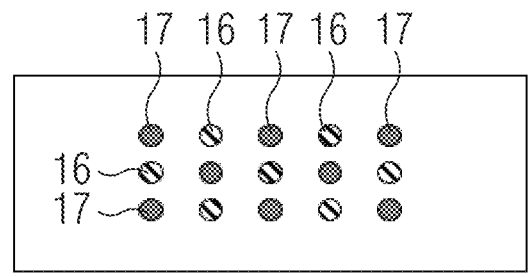

In FIG. 4D the first terminal 16 comprises seven contacts 21 and the second terminal 17 comprises eight contacts 21. All contacts 21 are circular shaped. The contacts 21 of both terminals 16, 17 are arranged in an alternating structure, this means in a checkerboard structure.

Figure 4E:
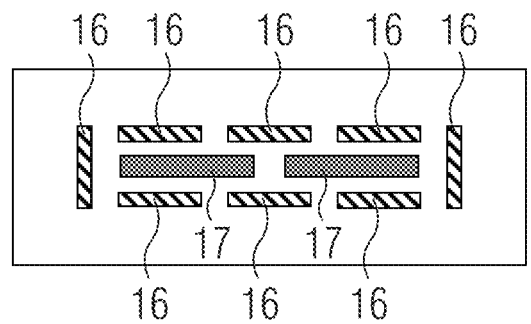

In FIG. 4E the first terminal 16 comprises eight contacts 21 and the second terminal 17 comprises two contacts 21. All contacts 21 are rectangular shaped. The contacts 21 of the first terminal 16 are coaxially arranged around the contacts 21 of the second terminal 17.

Figure 4F:
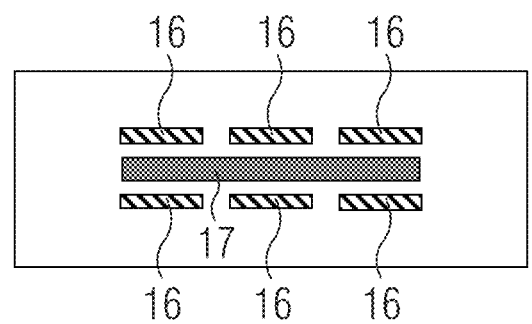

In FIG. 4F the first terminal 16 comprises six contacts 21 and the second terminal 17 comprises one contact 21. All contacts 21 are rectangular shaped. The two terminals 16, 17 are arranged coplanar and the second terminal 17 is arranged between the contacts 21 of the first terminal 16.

Figure 4G:
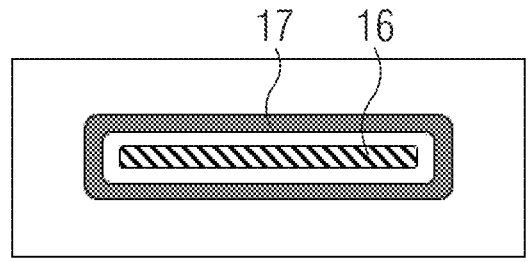

In FIG. 4G the first terminal 16 and the second terminal 17 each comprise one contact 21. The first terminal 16 is rectangular shaped. The second terminal 17 is arranged as a stripe that surrounds the first terminal 16.

Figure 4H:
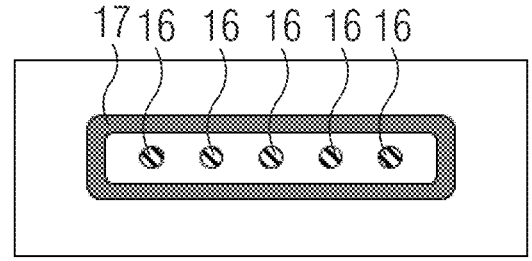

In FIG. 4H the first terminal 16 comprises five contacts 21 and the second terminal 17 comprises one contact 21. The contacts 21 of the first terminal 16 are circular shaped and are arranged along a line at the side surface of the battery 10. The second terminal 17 is arranged as a stripe that surrounds the contacts 21 of the first terminal 16.

Figure 4I:
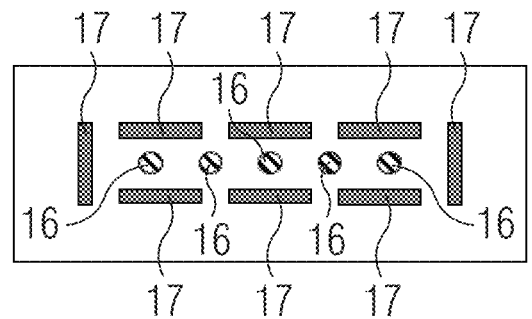

In FIG. 4I the first terminal 16 comprises five contacts 21 and the second terminal 17 comprises eight contacts 21. The contacts 21 of the first terminal 16 are circular shaped and are arranged along a line at the side surface of the battery 10. The contacts 21 of the second terminal 17 are rectangular shaped and coaxially arranged around the contacts 21 of the first terminal 16.

Figure 5A:
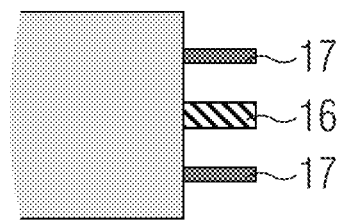

In FIG. 5A a side view of the battery 10 with the first terminal 16 and the second terminal 17 is shown. The contacts 21 of the first terminal 16 and the second terminal 17 are arranged as plugs.

Figure 5B:
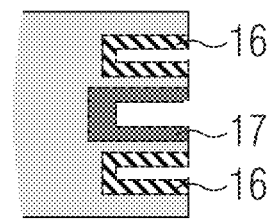

In FIG. 5B a side view of the battery 10 with the first terminal 16 and the second terminal 17 is shown. The contacts 21 of the first terminal 16 and the second terminal 17 are arranged as sockets.

Figure 6A:
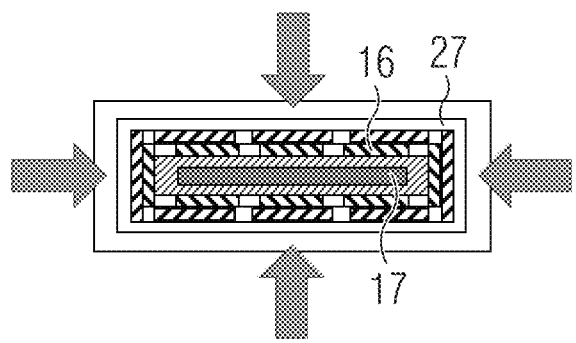

In FIG. 6A another alternative to arrange the first terminal 16 and the second terminal 17 at a side surface of the battery 10 is shown. The first terminal 16 comprises several contacts 21 and the second terminal 17 comprises one contact 21. The contacts 21 of the first terminal 16 are arranged coaxially around the contact 21 of the second terminal 17. The two terminals 16, 17 are electrically isolated against each other. A clamp 27 is arranged around the terminals 16, 17 in order to induce force on an external terminal which can be connected to the battery 10. The induced force is indicated by the arrows. In this way the contact between the two terminals 16, 17 and the external terminal is improved and the contact resistance is decreased.

Figure 6B:
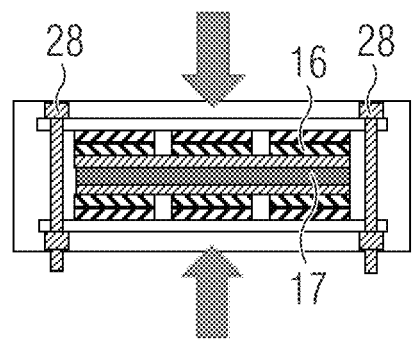

In FIG. 6B another alternative to arrange the first terminal 16 and the second terminal 17 at a side surface of the battery 10 is shown. The only difference to the embodiment shown in FIG. 13A is that the external terminal can be fixed to the terminals 16, 17 of the battery 10 by screws 28.

In FIG. 7A a plurality of battery cells 13 of a battery 10 for an electric vehicle is shown. A first group 36 comprises four battery cells 13 connected to each other in parallel. A second group 37 also comprises four battery cells 13 connected to each other in parallel. The first group 36 and the second group 37 are connected with each other in series forming a line 14. It is possible that further groups comprising battery cells 13 are connected in series with the first group 36 and the second group 37. The battery cells 13 can be for example lithium ion batteries with rated battery voltages between 3 and 4 V.

The number of groups connected to each other in series can be kept small enough such that the battery voltage does not exceed a desired value and at the same time the capacity of the battery 10 is as high as required for an electric vehicle. The battery voltage can for example be at least 6 V and at most 60 V.

In FIG. 7B four lines of battery cells 13 of a battery 10 for an electric vehicle are shown. A line 14 comprises a first group 36 and a second group 37 connected to each other in series. Three further lines 15 also comprises a first group 36 and a second group 37 connected to each other in series. The line 14 is connected to the further lines 15 in parallel.

The number of groups 36, 37 connected in series to each other in each line can be kept small enough such that the battery voltage does not exceed a desired value and at the same time the capacity of the battery 10 is as high as required for an electric vehicle.

In FIG. 8 four lines are connected to each other in parallel. Each line comprises at least a first group 36 and a second group 37 of battery cells 13. A fuse 24 is connected to a circuit node of a line 14 and to a circuit node of a further line 15. Two further fuses 24 are connected to further circuit nodes of the line 14 and of the further line 15, respectively. In this way, the line currents $I_1$ in the different lines can be regulated such that all line currents $I_1$ are the same. Furthermore, if for example a battery cell 13 or a group 36, 37 of battery cells 13 in the line 14 is defective a high line current $I_1$ can arise in the line 14. With the fuses 24 it is avoided that the high line current $I_1$ also flows through further lines 15. The fuses 24 can for example be realized as shown in FIG. 8 or as positive temperature coefficient thermistors.

In FIG. 9A two battery modules 22 are shown. Each battery module 22 comprises two lines 14, 15 each comprising two groups 36, 37 of battery cells 13. The line 14 and the further lines 15 are connected with each other in parallel by an electric line which can be for example an electric cable. Moreover, the two battery modules 22 are connected with each other in parallel.

By distributing the groups 36, 37 of battery cells 13 to the different battery modules 22 it is possible to arrange the different battery modules 22 at different places in the electric vehicle. Therefore, all places in the vehicle where there is space for battery modules 22 can be used.

In FIG. 9B two battery modules 22 and four lines 14, 15 are shown. Each line 14, 15 is distributed over the two battery modules 22. This means, a first group 36 of for example the line 14 is arranged in one battery module 22 and the second group 37 of the line 14 is arranged in the other battery module 22. The groups 36, 37 of each line are connected in series with each other. The four lines 14, 15 are connected to each other in parallel.

If all lines of the battery 10 are comprised by at least two battery modules 22 temperature differences between the battery modules 22 and different contact resistances of different battery modules 22 are experienced by all lines in the same way. Therefore, differences in capacity or voltage of the lines due to external parameters as the temperature or contact resistances of the battery modules 22 are avoided.

FIG. 10 shows an electrical circuit with four battery modules 22 connected to each other in parallel. Three of the battery modules 22 can be disconnected from the other battery modules 22 by a switch 35 which is connected in series with the respective battery module 22. This means, each of these battery modules 22 is assigned a respective switch 35 to activate and/or deactivate the respective battery module 22. The first switch 35 on the left-hand side of the electrical circuit is a DC/DC converter. The second switch 35 is a mechanical switch and the third switch 35 is a semiconductor switch. The fourth battery module 22 cannot be disconnected by a respective switch 35. It is also possible that further battery modules 22 are connected to the four battery modules 22 in parallel.

In FIG. 11 groups 36, 37 of battery cells 13 connected to the electric machine 33 of the electric vehicle are shown. The groups 36, 37 can be comprised by different battery modules 22 which are not shown. The groups 36, 37 are arranged in four different lines where each line comprises a first group 36 and a second group 37. The electric machine 33 comprises different electrical phases φ. The electrical phases φ can each be supplied with a respective phase current. The phase currents comprise an AC and a DC component. Each line is connected to two or more electrical phases φ of the electric machine 33. The electrical phases φ are short-circuited on a short circuit ring 29 of the electric machine 30. Therefore, the line currents $I_1$ are equalized if the groups 36, 37 of battery cells 13 are connected with the electrical phases φ.

This means, the electric machine 33 is employed to equalize the line currents $I_1$ of the different lines of battery cells 13. As the electric machine 33 is controlled by the AC components of the phase currents the regulation of the line currents $I_1$ can take place both when the electric machine 33 is operated and when it is not operated.

In order to exchange battery modules 22, switches 35 are arranged between the lines. If single battery modules 22 can be exchanged and be replaced by charged battery modules 22 the charging level of the charged battery modules 22 and the battery modules 22 which are not replaced can be very different. This means, high compensation currents can arise. By regulating the line currents $I_1$ by coupling the battery modules 22 to the electric machine 33 the losses during regulation of the line currents $I_1$ are smaller in comparison to losses during a regulation of the line currents $I_1$ by passive elements as for example a positive temperature coefficient thermistor.

In FIG. 12A a battery cell 13 with an electrical contact 21 is shown. The electrical contact 21 is a contact comprising a screw. The electrical contact 21 of the battery cell 13 is connected to a metal sheet 25. The metal sheet 25 can comprise aluminum or copper and it can connect several battery cells 13 with each other in parallel. The metal sheet 25 comprises a circular shaped hole around the electrical contact 21 except for two connections 26. The connections 26 act as fuses 24. If the current flowing from the battery cell 13 towards the metal sheet 25 is too high the two connections 26 will warm up and melt. For a better stability against for example torque exerted on the electrical contact 21 the metal sheet 25 comprises two connections 26 instead of only one.

In FIG. 12B a battery cell 13 with an electrical contact 21 which is a welding contact is shown. In this case the metal sheet 25 only comprises one connection 26 as a fuse 24 since no torque is exerted on the electrical contact 21.

In FIG. 13 six battery cells 13 which are connected with metal sheets 25 are shown. Three battery cells 13 are connected with a metal sheet 25 on a top side of the battery cells 13 and with another metal sheet 25 on a bottom side of the battery cells 13 facing away from the top side. Three further battery cells 13 are also connected with a metal sheet 25 on the top side and with another metal sheet 25 on the bottom side of the battery cells 13. The two metal sheets 25 on the top side of the battery cells 13 are connected with each other by two thin connections 26. Similarly, the two metal sheets 25 on the bottom side of the battery cells 13 are connected with each other by two thin connections 26. The connections 26 act as fuses 24 as described with FIG. 12A.

In FIG. 14 an embodiment of the power system 32 is shown. The power system 32 comprises a circuit arrangement 11 as described above. The power system 32 further comprises an electric machine 33 and a power net 34, where the first output 18 is electrically coupled to the electric machine 33 and the second output 19 is electrically coupled to the power net 34. This means, the battery 10 is configured to supply both the electric machine 33 and the power net 34 of the electric vehicle with power. Consequently, only one battery 10 is required for the electric vehicle.

The power system 32 can be comprised by an electric vehicle. The power system is arranged to supply the electric vehicle with power, to enable movement of the electric vehicle and to enable the operation of the devices of the power net 34.

Advantageously, the electric machine 33 and the power net 34 are supplied with the same voltage level by the battery 10, as neither between the first terminal 16 of the battery 10 and the first output 18 nor between the first terminal 16 and the second output 19 converters are arranged.

LIST OF REFERENCE NUMERALS

10: battery
11: circuit arrangement
12: reference potential terminal
13: battery cell
14: line
15: further line
16: first terminal
17: second terminal
18: first output
19: second output
20: first switch
21: contact
22: battery module
23: second switch
24: fuse
25: metal sheet
26: connection
27: clamp
28: screw
29: short circuit ring
30: sub-switch
31: inductivity
32: power system
33: electric machine
34: power net
35: switch
36: first group
37: second group
$I_1$: line current
$\varphi$: electrical phase

The invention claimed is:

1. A circuit arrangement for supplying an electric vehicle with power, the circuit arrangement comprising:
    a battery with a first terminal and a second terminal,
    a reference potential terminal directly connected to the second terminal of the battery,
    a first output that is coupled to the first terminal of the battery via a first switch and that is configured to be connected to an electric machine of the electric vehicle,
    a second output that is directly and permanently coupled to the first terminal of the battery and that is configured to be connected to a power net of the electric vehicle, and
    the battery is configured to supply both the electric machine which is a main traction motor of the electric vehicle and the power net of the electric vehicle with power;
    wherein a battery voltage which can be tapped between the first terminal and the second terminal of the battery is at most 60 V.

2. The circuit arrangement according to claim 1, where the electric vehicle is at least one of:
    a craft that can move on ground,
    a craft that can move in the air,
    a craft that can move on and/or in water.

3. The circuit arrangement according to claim 1, where the first switch comprises at least two sub-switches arranged in at least two parallel lines where the parallel lines are connected with each other by an inductive connection which comprises at least one inductivity.

4. The circuit arrangement according to claim 1, where the first terminal and the second terminal of the battery are coplanar or coaxial.

5. The circuit arrangement according to claim 1, where the first terminal and/or the second terminal of the battery comprise at least two contacts, respectively.

6. The circuit arrangement according to claim 1, where the battery comprises at least one line of battery cells, where a first group comprises a plurality of battery cells connected to each other in parallel, a second group comprises a plurality of battery cells connected to each other in parallel, and the first group and the second group are connected with each other in series forming the line of battery cells.

7. The circuit arrangement according to claim 6, where the line is connected to at least one further line in parallel, where the further line comprises the same features as the line, and a fuse is connected to a circuit node of the line and to a circuit node of the further line.

8. The circuit arrangement according to claim 7, where the fuse is a positive temperature coefficient thermistor.

9. The circuit arrangement according to claim 1, where the battery comprises at least two battery modules.

10. The circuit arrangement according to claim 9, where the at least two battery modules are configured to be electrically coupled to the electric machine of the electric vehicle.

11. The circuit arrangement according to claim 9, where the at least two battery modules are arranged in parallel and each battery module is assigned a respective switch to activate and/or deactivate the respective battery module.

12. A power system for an electric vehicle, the power system comprising:
    a circuit arrangement comprising:
        a battery with a first terminal and a second terminal,
        a reference potential terminal directly connected to the second terminal of the battery,
        a first output that is coupled to the first terminal of the battery via a first switch and that is configured to be connected to an electric machine of the electric vehicle,
        a second output that is directly and permanently coupled to the first terminal of the battery and that is configured to be connected to a power net of the electric vehicle, and the battery is configured to supply both the electric machine which is a main traction motor of the electric vehicle and the power net of the electric vehicle with power;

wherein a battery voltage which can be tapped between the first terminal and the second terminal of the battery is at most 60 V.

13. The power system according to claim 12, where the electric machine and the power net are supplied with a same voltage level by the battery.

14. The power system according to claim 12, where the electric machine is only powered by the battery.

15. A circuit arrangement for supplying an electric vehicle with power, the circuit arrangement comprising:

a battery with a first terminal and a second terminal, a reference potential terminal directly connected to the second terminal of the battery, a first output that is coupled to the first terminal of the battery via a first switch and that is configured to be connected to an electric machine of the electric vehicle, and a second output that is directly and permanently coupled to the first terminal of the battery and that is configured to be connected to a power net of the electric vehicle, wherein the battery comprises at least one line of battery cells, where a first group comprises a plurality of battery cells connected to each other in parallel, a second group comprises a plurality of battery cells connected to each other in parallel, and the first group and the second group are connected with each other in series forming the line of battery cells, and wherein a battery voltage which can be tapped between the first terminal and the second terminal of the battery is at most 60 V.

* * * * *